United States Patent
Hoshino et al.

(12) 
(10) Patent No.: US 6,323,923 B1
(45) Date of Patent: Nov. 27, 2001

(54) REFLECTIVE TYPE LCD HAVING A SOLAR CELL FORMED OF SAME MATERIAL AND SAME SURFACE AS AN ACTIVE ELEMENT

(75) Inventors: Masafumi Hoshino; Shuhei Yamamoto; Shunichi Motte; Teruo Ebihara; Shigeru Senbonmatsu; Kaori Takano; Osamu Yamazaki; Naotoshi Shino; Takakazu Fukuchi; Hiroshi Sakama, all of Chiba (JP)

(73) Assignee: Seiko Instruments R&D Center Inc. (JP)

( * ) Notice: Subject to any disclaimer, the term of this patent is extended or adjusted under 35 U.S.C. 154(b) by 0 days.

(21) Appl. No.: 09/293,866

(22) Filed: Apr. 16, 1999

(30) Foreign Application Priority Data

Apr. 17, 1998 (JP) .................................. 10-108315
Mar. 8, 1999 (JP) .................................. 11-060397

(51) Int. Cl.$^7$ ............................. G02F 1/136; G02F 1/1335
(52) U.S. Cl. ............................................. 349/113; 349/42
(58) Field of Search ............................. 349/113, 42, 43; 257/59, 72; 399/92, 93, 113

(56) References Cited

U.S. PATENT DOCUMENTS

| 4,694,116 | * | 9/1987 | Hayashi et al. ................... 136/256 |
| 5,061,040 | * | 10/1991 | Yaniv et al. ....................... 349/50 |
| 5,637,187 | * | 6/1997 | Takasu et al. ...................... 438/30 |
| 5,686,017 | * | 11/1997 | Kobayashi et al. ............ 252/299.01 |
| 5,811,348 | * | 9/1998 | Matsushita et al. ................ 438/455 |

FOREIGN PATENT DOCUMENTS 08-160386 * 12/1996 (JP) .

* cited by examiner

Primary Examiner—Toan Ton
(74) Attorney, Agent, or Firm—Adams & Wilks (57) ABSTRACT

A reflective type liquid crystal display device has a first transparent substrate, a second transparent substrate, and a light scattering liquid crystal layer disposed between the first and second transparent substrates. A solar cell is disposed on the second transparent substrate. A portion of the solar cell comprises an active element for driving the light scattering liquid crystal layer.

10 Claims, 6 Drawing Sheets

PRIOR ART

REFLECTIVE TYPE LCD HAVING A SOLAR CELL FORMED OF SAME MATERIAL AND SAME SURFACE AS AN ACTIVE ELEMENT

BACKGROUND OF THE INVENTION

The present invention relates to a reflective type liquid crystal display device capable of photoelectrically converting a part of incident light to be supplied with power, and a method for manufacturing same. More particularly, the invention relates to a reflective type liquid crystal display device usable for timepieces, handy phones, portable information terminals and so on.

Liquid crystal display devices are broadly used as display panels of appliances in various applications, due to many superior features including thin size and low power consumption.

The reflective type LCD is operable on extremely reduced power because it does not require a light self-emitting device such as a back light source. Meanwhile, there is a tendency toward decreasing power consumption of an LSI as a principal component for constituting a small-sized portable electronic appliance. Due to this, there is also a tendency, in an LSI power source, to replace the conventional battery for the reflective type LCD by a photovoltaic element. The photovoltaic element in general often uses a photoelectric converting device called a solar battery. Small-sized portable appliances built with a reflective LCD and solar battery, including a timepiece, desk-top calculator and radio, have been put into marketing in today's marketplaces.

The conventional small-sized portable appliance structure incorporating a reflective LCD and photovoltaic element has the following disadvantages. In the case of the card-type desk top calculator for example, if the display section is enlarged in area in order to facilitate display reading, the solar battery section area is decreased thus resulting in insufficient power to operate the card desk-top calculator. Also, if the key input section area is increased to facilitate input operation, the solar cell section area is similarly decreased resulting in insufficient power for operating the card desk-top calculator. Consequently, the solar battery section area is preferably made as small as possible in respect of designing a card desk-top calculator with its inherent functions fully reflected.

In the case of the digital watch, if the display section area is increased to make easy display reading, the solar battery section area is decreased resulting in insufficient power to operate the digital watch. Also, the existence of broad blackish solar cell in a digital watch surface makes design rustic. This makes the fashionability essential for a watch poor, considerably reducing its commodity value.

This problem is similarly true for the conventional small-sized portable appliance incorporating a reflective LCD and solar battery. It can be considered, as a measure for solving this problem, to stack the reflective LCD and the solar battery.

There is a considerable concrete method wherein a solar battery transmissible of light to generate power is placed over a reflective LCD. Such a solar battery may be a see-through type solar battery having a plurality of fine pores. However, this method includes the following problems.

If it is assumed the see-through type solar battery has a light transmission rate of 30%, the structure with the solar battery on the reflective LCD has an optical path duplicated in transmission and reflection. This reduces the brightness of the reflective LCD to about 9% as compared with a usual using state, making extremely dark. Further, the reflection on the surface solar battery decreases visibility. Accordingly, in this case nothing is obtained other than dark and low visible display wherein the power generating efficiency of the solar battery decreases to 50% or lower as compared with that of the usual solar battery.

Figure 4:
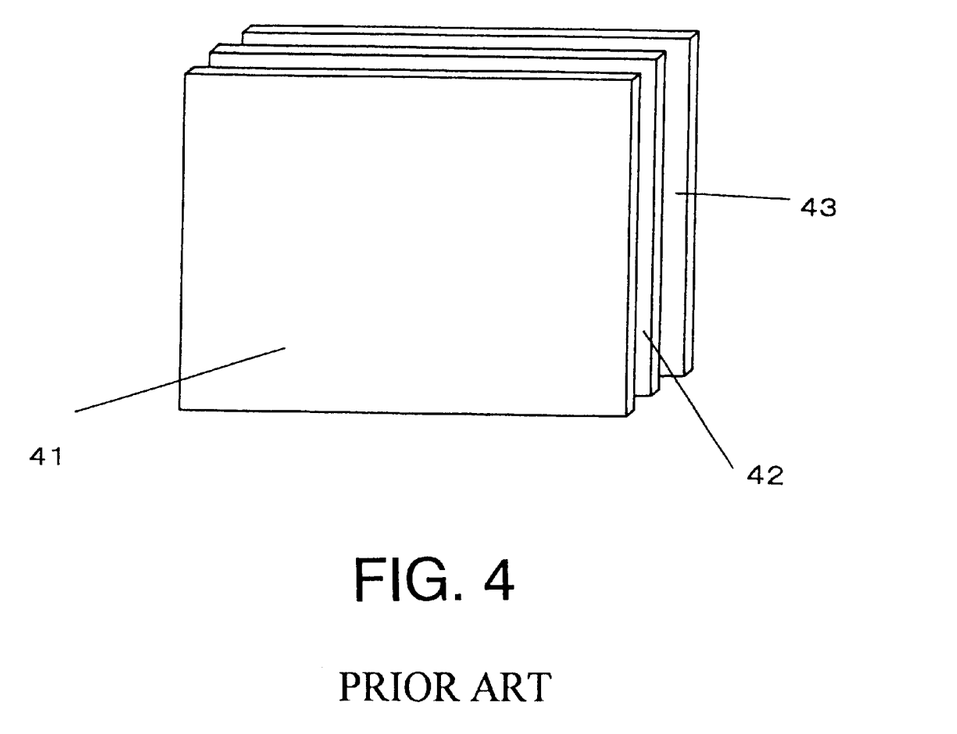
FIG. 4 is a view showing a conventional method having a solar battery placed at the back of a light scattering LCD.

Meanwhile, another method can be considered that a solar battery 42 is provided at the back of a light-scattering liquid crystal device 41 as disclosed in JP-A-8-160380 (FIG. 4).

In addition to the above method, it is possible to both satisfy the reduction in power generating efficiency and the lessen deterioration in display quality; by providing between a light scattering liquid crystal display device 41 and a solar battery 42 a reflective layer having a characteristic with a light reflectivity of 20–70% to absorb almost no visible portion of light in a particular range but transmit almost the remaining visible and near infrared portions of light, and providing at the back a solar cell 42 having a spectral sensitivity worse in the visible portion of light.

The conventional structure with a stacked reflective LCD and solar battery has the following disadvantage.

That is, where the solar battery is placed in front of the reflective LCD, display quality degrades with decreased power generating efficiency. Meanwhile, if the solar battery is arranged at a back of the light scattering reflective LCD, it is possible to satisfy the reduction both in power generating efficacy decrease and in decrease of display quality. However, because the light scattering liquid crystal is difficult to effect high time divisional drive, an LCD sufficient in information volume cannot be realized unless combined with active elements such as MIM or TFT, resulting in expensive in cost as compared with the simple matrix panel.

SUMMARY OF THE INVENTION

It is therefore an object of the present invention to realize at low cost a reflective type liquid crystal display device with brightness and good visibility which is capable of photoelectrically converting part of incident light into electric power to be supplied for normally operating a portable electronic appliance.

According to the present invention, to solve the aforementioned problems, an reflective type liquid crystal display device is structured having a scattering liquid crystal layer sandwiched between at least two transparent substrate, the reflective type liquid crystal display device characterized in that a solar cell is formed on a lower substrate and an active element is formed using part of that: portion, thereby effecting high time division drive to the scattering liquid crystal layer.

DETAILED DESCRIPTION OF THE PREFERRED EMBODIMENTS

Embodiments of the present invention will now be described. The operational principle of the solar battery is first explained with reference to FIG. 5. The solar battery in general has as a principal structure a p-n junction formed in a semiconductor on which light is impinged in order to cause photovoltaic effects for operation. If a semiconductor is impinged by a light having an energy greater than a forbidden band energy Eg 510, the electrons 58 in the valence band absorb photon energy and are excited to a conduction band, giving rise to pairs of electrons 58 and holes 59. Of the electrons 58 and holes 59 caused in a depletion layer (w) 56, the electrons are moved toward an n-type region 51 and the holes 59 are moved toward a p-type region 52 by an internal electric field existing in this region, thus being separated to and accumulated in the respective regions. The holes 59, among those caused in the n-type region 51 and diffusely moved to a depletion layer 56 end within a minority carrier lifetime ($\tau p$), are experienced by an electric field present in this region and separatedly accelerated toward the p-type region 52. The other holes 59, after a lapse of the lifetime, recombine with electrons 58 as major carriers, thus being vanished away. In other words, it is considered that advantageous separation is effected for the holes 59 created in a range of a minority carrier (hole) diffusion distance Lp 55 in the n-type region 51 from a depletion layer 56 boundary. This is true for the electrons 58 caused in the p-type region 52. That is, the electrons 58 occurred within a minority carrier (electron) diffusion distance Ln 57 can be utilized effectively.

Figure 5:
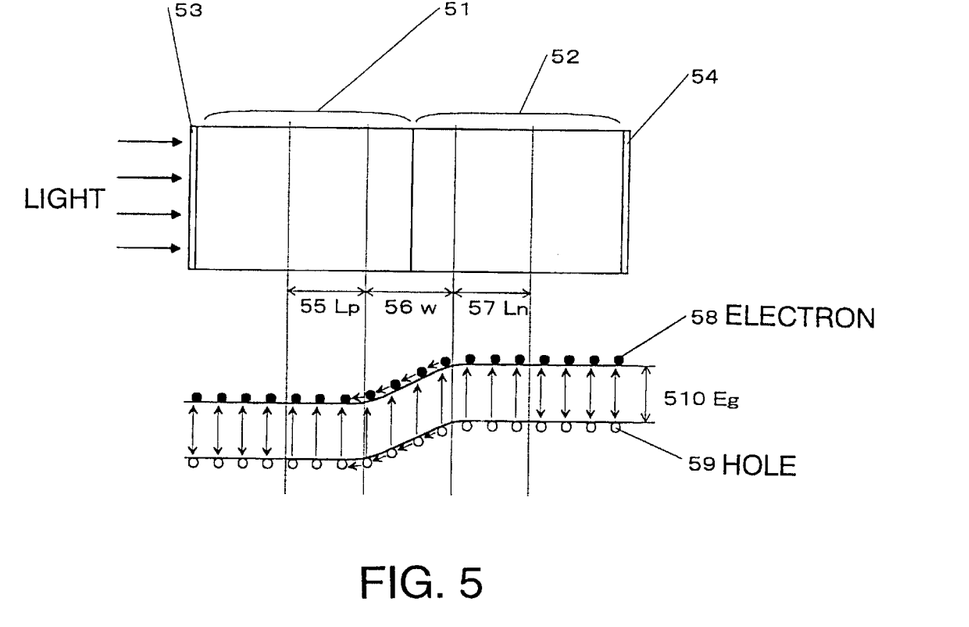
FIG. 5 is a diagram showing an operation principle of a solar cell.

In this manner, pairs of electron 58 and hole 59 in a region (Lp 55+w56+Ln 57), among those occurred due to photon absorption, are separated and accumulated in the n-type and p-type regions. This causes the respective regions to be electrified negative and positive to give therebetween a potential difference (photovoltaic force), whereby the electric charges are allowed to flow through an external circuit for supplying electric power.

In the meanwhile, where a-Si thin film is employed as a solar battery material, the minority carriers are shorter in diffusion length than those of a single crystal and having low carrier mobility and hence extremely low electric conductivity. For this reason, it is a general practice to make the p-type and n-type regions as thin as possible to provide a pin structure having an i-type region that allows a carrier-separating internal electric field to be present, thus enabling almost all of light absorption within the i-type region.

Now an active matrix liquid crystal panel is described that uses diodes.

Figure 6:
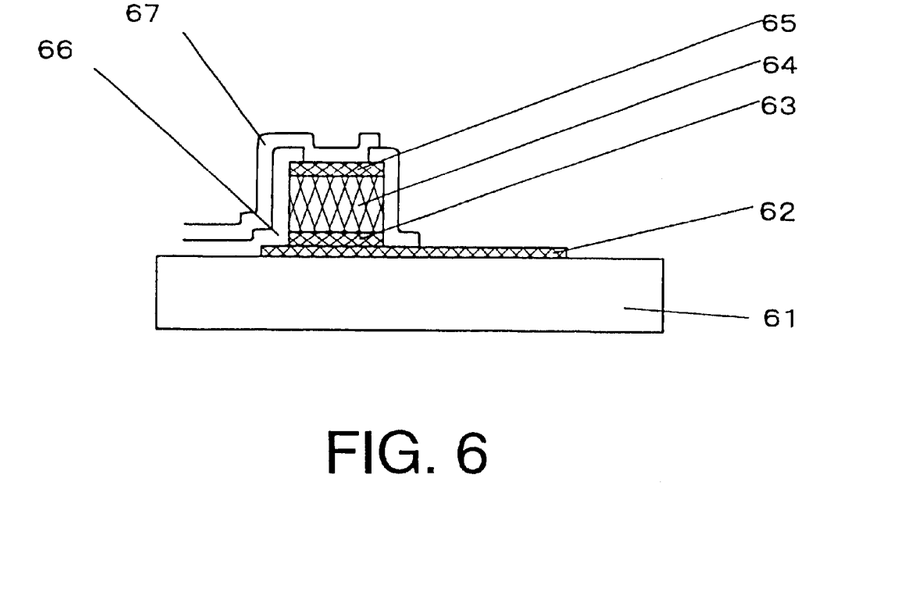
FIG. 6 is a view showing a section of an a-Si pin diode.

It is possible to cause p/n valence control in an a-Si film employed in the solar battery, etc. wherein diodes can be preferably arranged in a pin structure. FIG. 6 depicts a sectional view of an a-Si pin diode.

The diode exhibits non-linear characteristics in forward and reverse directions, which is-usable as a switch element. As a switch element to drive liquid crystal, first developed was a back-to-back method using a reverse characteristic. After that, a ring diode method was developed utilizing a forward characteristic. Both methods were proposed in 1971, together with TFT by Lechner et al., RCA. Comparing these two methods, the ring diode using built-in potential at a pin junction is more preferred in respect of threshold stability, controllability and reproducibility. However, the back-to-back method is comparatively free in designing a threshold, whereas the ring diode has a small threshold of 0.6 V. Due to this, the ring diode requires bias drive method.

The bias method is characterized by its scan signal form developed for a low threshold device, wherein ±Vb bias voltages are applied in a non-selective duration. By setting this bias voltage Vb as a center voltage in changing liquid crystal characteristic, the switch element threshold width can be utilized as it is for a driving dynamic range.

As explained above, both the solar battery and the active matrix liquid crystal panel with diodes use pin-structured diodes. However, the solar battery is formed with diodes over the entire panel surface whereas the active matrix liquid crystal panel has diodes partly arranged only in its pixels with the most part removed through patterning.

Due to this, it is possible to simultaneously make a solar batter and an active device on a common substrate through film-forming only once a-Si film with a pin structure.

Meanwhile, although a liquid crystal usable herein is not limited, a light-scattering liquid crystal is best suited without using a polarizing plate as disclosed in JP-A-8-160386.

Also, the material and structure of a diode thin film applicable hereto is not especially limited provided that photovoltaic effects and rectifying characteristics are offered. For example, a single crystal Si, polycrystal Si, CdS/Cu2s, CdS/CdTe, Gaks, and so on may be employed instead of amorphous Si.

Figure 1A:
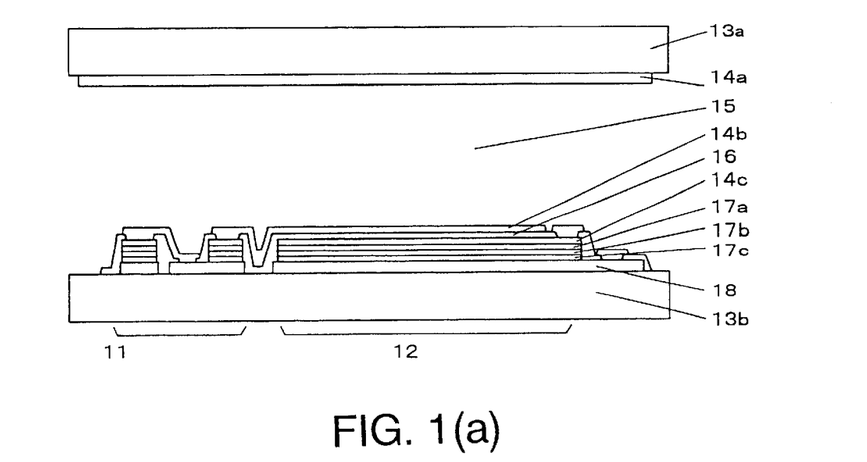
FIG. 1A is a section structural view of a reflective type liquid crystal display device of Embodiment 1.
Figures 1B, 1C:
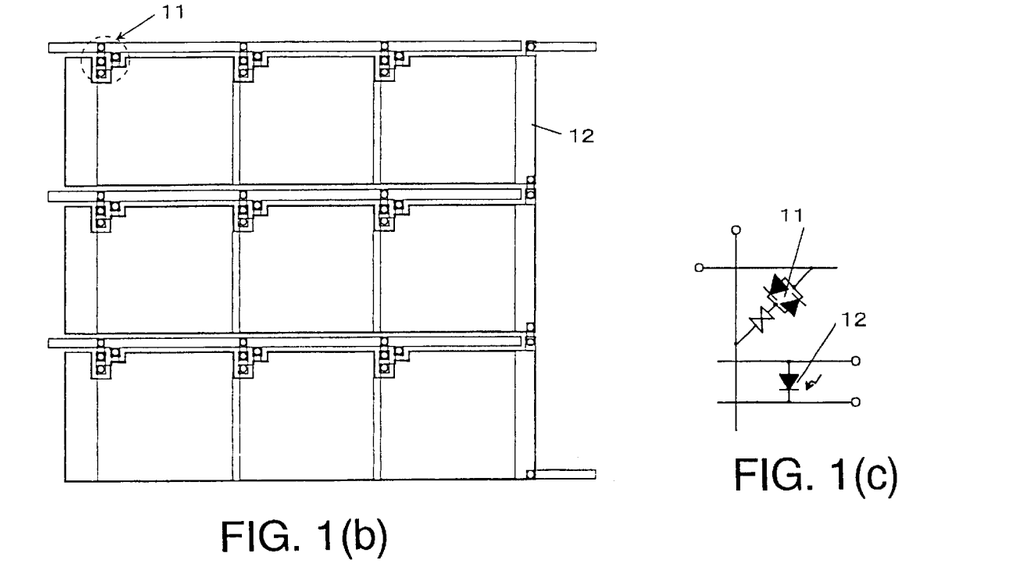
FIG. 1B is a pattern view of the reflective type liquid crystal display device of Embodiment 1.
FIG. 1C is a one-pixel equivalent circuit C of the reflective type liquid crystal display device of Embodiment 1.

FIGS. 1A–C shows a section structural view A of a lower substrate of a reflective type liquid crystal display device according to Embodiment 1, a pattern view B, and a one-pixel equivalent circuit C. As shown in FIG. 1A, a reflective type liquid crystal display device is structured by a transparent substrate 13$b$ formed with ring diodes 11 and solar cells 12, a transparent substrate 13$a$ having a patterned transparent electrode 14$a$, and a polymer dispersed liquid crystal 15 as a light-scattering liquid crystal sandwiched between the transparent substrate 13$a$, 13$b$. Here, the cell gap was determined to be approximately 10 $\mu$m. The transparent substrates 13$a$, 13$b$ in Embodiment 1 used flat, smooth and transparent glass plates. Note that the transparent substrates 13$a$, 13$b$ may be a transparent polymeric film in place of the flat, smooth and transparent glass plate.

Now a method for manufacturing a lower substrate is described according to a method for manufacturing a reflective type liquid crystal display device of the present invention.

In a first process, an aluminum film was formed to 1000–2000 angstroms by a sputter technique over a transparent substrate 13$b$. Then photolithography was performed to form, at the same time, a solar cell 12 lower electrode, a ring diode 11 lower electrode, and a scan electrode. Note that the electrode material may be another metal, such as gold, chromium or the like.

In a second process, a plasma CVD process was then performed to form an n-type a-Si:H (17$c$), an i-type a-Si:H (17$b$) and a p-type a-Si:H (17$a$) consecutively on the substrate after the first process. Silane (SiH$_4$) was used as a material gas wherein phosphine (PH3) was added for the n-type a-Si:H (l7$c$) and diborane (B2H6) was added for the p-type a-Si:H (17a). The reactive condition was under a gas pressure of 1 Torr, a substrate temperature of 200–400° C. and a radio frequency power of 20–100 W, forming an n-type to 20–300 angstroms, an i-type to 5000–7000 angstroms and a p-type to 50–100 angstroms.

Then vacuum evaporation was carried out to form an $In_2O_3SnO_2$ film (hereinafter referred to as "ITO film") to 300–400 angstroms for a transparent electrode 14c.

Thereafter the ITO film and the a-Si film were etched in the order through photolithography into a form of diodes and solar cells. Note that the transport electrode 14c may use an $SnO_2$ film instead of the ITO film.

In a third process, photosensitive transparent resist was applied by printing or through a spinner and subjected to light exposure and development to thereby form a insulation film 16 having connection ports to a diode and solar cell. The insulation film 16 may be formed by depositing an insulation film, such as of $SiO_2$ and $Si_3N_4$, through plasma CVD and then patterning it.

In a fourth process, an ITO film was formed to 300–400 angstroms by vacuum evaporation, and then subjected to photolithography thereby being formed into pixel electrodes, diode-connection electrodes and solar cell electrodes. Note that the transparent electrode 14b may use an $SnO_2$ film instead of the ITO film.

Also, for an upper substrate, an ITO film was formed to 500–1000 angstroms on a transparent substrate 13a by a sputtering or vacuum evaporation method and then subjected to photolithography, thereby being formed into a transparent electrode 14a. Note that the transparent electrode 14a may use an $SnO_2$ film instead of the ITO film. Also, the transparent substrate 13a, 13b may use a transparent polymeric film.

For a light-scattering liquid crystal layer 15, in Embodiment 1 a mixture solution for a light-scattering liquid crystal layer 15 was poured into a device cell formed by the upper and lower substrates thus formed, wherein the solution is homogeneously dissolved with a polymer resin, such as an acrylate monomer, to be crosslinked and polymerized by a ultraviolet (UV) ray exposure, a nematic liquid crystal having a positive dielectric anisotropy, and a UV-curing start agent. Ultraviolet ray exposure was made to set only the polymeric resin thus phase-separating the nematic liquid crystal with a positive dielectric anisotropy. The blending ratio of the polymeric resin to the nematic liquid crystal is preferably 8:2–1:9. Incidentally, a continuous liquid crystal phase with a polymer network is easier to realize voltage reduction than an independent liquid crystal fine droplet structure. Accordingly, it is more preferred that the ratio is in a range of 4:6–1:9. The scattering mode liquid crystal used for the light scattering liquid crystal layer 15 may use, instead of the polymer dispersed liquid crystal, a choresteric-nematic phase transition liquid crystal mode, ferroelectric liquid crystal scattering mode, polymer dispersed liquid crystal mode, dynamic scattering mode (DSM), or thermal writing mode.

Figure 2A:
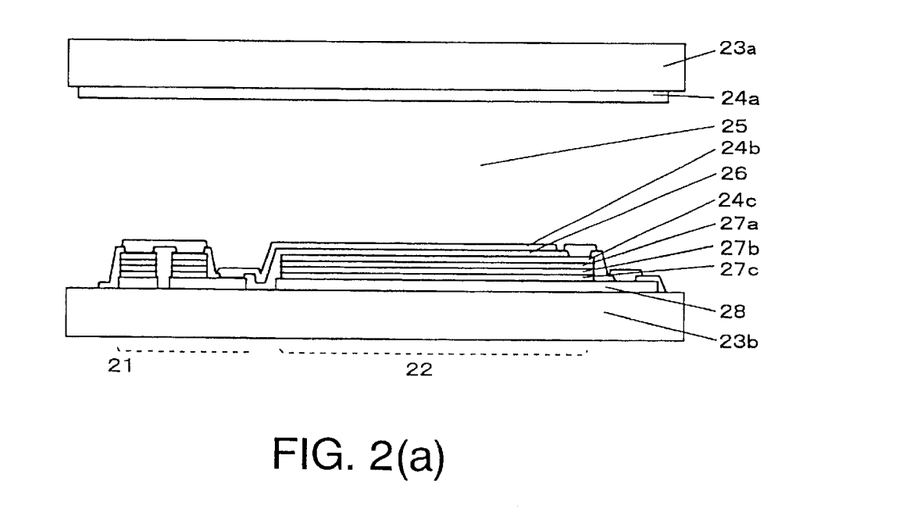
FIG. 2A is a section structural view A of a reflective type liquid crystal display device of Embodiment 2.
Figure 2B:
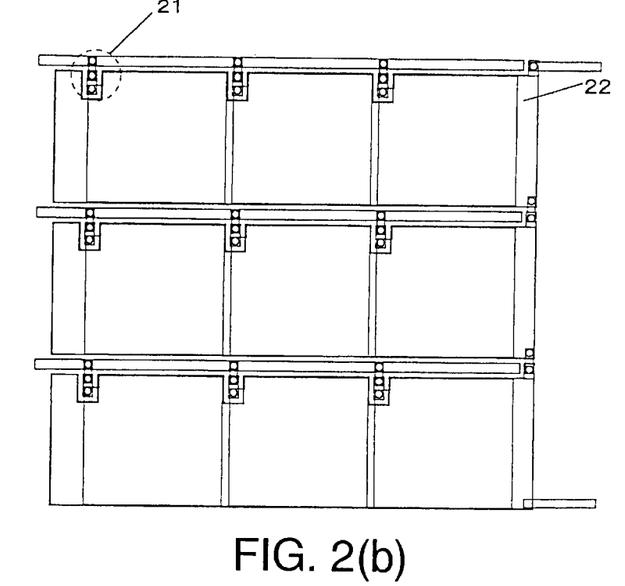
FIG. 2B is a patern view of the reflective type liquid crystal display device of Embodiment 2.
Figure 2C:
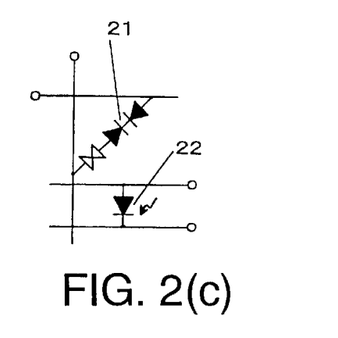
FIG. 2C is a one-pixel equivalent circuit C of the reflective type liquid crystal display device of Embodiment 2.

FIG. 2A–C shows a section structural view A of a lower substrate of a reflective type liquid crystal display device according to Embodiment 2, a pattern view B, and a one-pixel equivalent circuit C. As shown in FIG. 2A, a reflective type liquid crystal display device is structured by a lower substrate formed with back-to-back diodes 21 and solar cells 22, an upper substrate provided with a patterned transparent electrode 24a, and a polymer dispersed liquid crystal 25 as a light scattering liquid crystal sandwiched between transparent substrates 23a, 23b. Here, the cell gap was determined to be approximately 10 μm.

The reflective type liquid crystal display device of Embodiment 2 may be manufactured by the similar process to that of Embodiment 1. The transparent substrate 23a, 23b may use a transparent polymeric film instead of the flat, smooth and transparent glass plate, similarly to those of Embodiment 1.

Also, the scattering mode liquid crystal used for the light scattering liquid crystal layer 25 may use, instead of the polymer dispersed liquid crystal, a choresteric-nematic phase transition liquid crystal mode, ferroelectric liquid crystal scattering mode, polymer dispersed liquid crystal mode, dynamic scattering mode (DSM), or thermal writing mode.

When observing the reflective type liquid crystal display device manufactured in Embodiments 1 and 2 under a condition with a fluorescent light of 200 lx, incident white light scattered in bright white was observed in (OFF) areas that was not sufficiently applied by drive voltage. In (ON) areas sufficiently applied by drive voltage, observation was in black due to absorption of incident white light by the solar cells. Meanwhile, the solar cells during OFF had an output of 1.4 $\mu A/cm^2$ at an output voltage of 1.5 V. During ON an output of 2.5 $\mu A/cm^2$ was obtained at an output voltage of 1.5 V.

Figure 3:
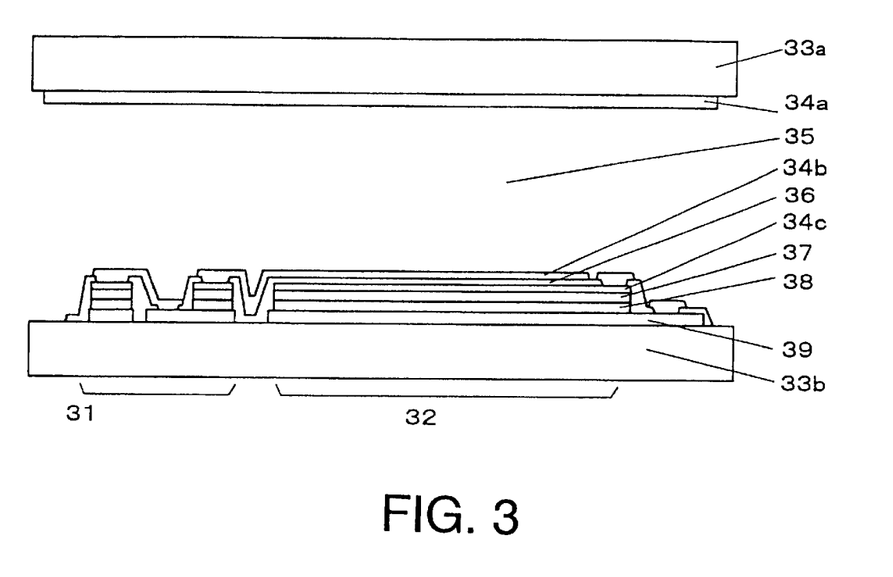
FIG. 3 is a section structural view of a reflective type liquid crystal display device of Embodiment 3.

FIG. 3 is a section structural view of a reflective type liquid crystal display device according to Embodiment 3. The reflective type liquid crystal display device was structured, similarly to Embodiment 1, by a transparent substrate 33b formed with ring diodes 31 and solar cells 32, a transparent substrate 33a having a transparent electrode 34a, and a polymer dispersed liquid crystal as a light-scattering liquid crystal 35 sandwiched between the transparent substrate 33a, 33b. Here, the cell gap was determined approximately 10 μm.

The different point from Embodiment 1 lies in that the ring diode 31 and solar cells 32 were formed by screen printing.

A method for manufacturing a lower substrate is described below according to process steps therefor.

In a first process, an aluminum film was formed to 1000–2000 angstroms by a sputter technique over a transparent substrate 33b. Then photolithography was performed to form, at the same time, a solar cell 12 lower electrode, a ring diode 31 lower electrode, and a scan electrode. Note that the electrode material may be another metal, such as gold, chromium or the like.

In a second process, a CdTe paste was screen-printed on the substrate formed in the first process to a predetermined pattern, and then cured and baked into an n-layer 38. Subsequently, a p-layer 37 was formed using a CdS paste in the similar process to the above.

Then, a mixture of a thermosetting acrylic resin with a ultrafine ITO powder was offset-printed, and then cured and baked into a transparent electrode 34c.

In a third process, an insulation ink (JELCON ink, IN series, by Jyujho chemical) was screen-printed, and then cured and baked into an insulation film 36 with connection ports to a diode and solar cell.

In a fourth process were formed a pixel electrode, a diode connection electrode and solar cell extension electrode, in the similar process to the transparent electrode 34c.

Meanwhile, for an upper substrate, an ITO film was formed to 500–1000 angstroms by sputtering or vacuum evaporation on a transparent substrate 33a, and then subjected to photolithography thus being formed into a transparent electrode 34a.

A continuous liquid crystal phase structure with a polymer network similar to Embodiment 1 was used as a light scattering liquid crystal layer 35, to manufacture a reflective type liquid crystal display device.

The reflective type liquid crystal display device manufactured in Embodiment 3 was observed under a condition of a fluorescent light of 200 lx. Thereupon, incident white light scattered in bright white was observed in (OFF) areas that is not sufficiently applied by drive voltage. In (ON) areas sufficiently applied by drive voltage, observation was in black due to absorption of incident white light by the solar cells. Meanwhile, the solar cells during OFF had an output of 1.0 $\mu$A/cm$^2$ at an output voltage of 1.2 V. During ON, they have an output of 1.8 $\mu$A/cm$^2$ at an output voltage of 1.2 V.

As described above, the reflective type liquid crystal display device according to the present invention is manufactured at low cost by integrally making the liquid crystal panel and the solar battery panel, instead of separately making and using the liquid crystal panel and the solar battery panel as in the conventional art.

For portable appliance panels, it is possible to manufacture a panel that is thin and light-weighted but high in display quality.

What is claimed is:

1. An reflective type liquid crystal display device comprising:
   an upper substrate;
   a lower substrate;
   a scattering liquid crystal layer disposed between the upper substrate and the lower substrate;
   a solar cell disposed on the lower substrate; and
   an active element disposed on the lower substrate for driving the liquid crystal layer, the active element and the solar cell being composed of the same material.

2. A reflective type liquid crystal display device according to claim 1; further comprising an insulation layer disposed on the solar cell and the active element and having a plurality of connection ports; and a pixel electrode disposed on the insulation layer and connected to the active element through the connection ports.

3. A reflective type liquid crystal display device according to claim 1; wherein the scattering liquid crystal layer comprises a polymer dispersed liquid crystal layer which undergoes a variation in light scattering state by application of a voltage thereto.

4. A reflective type liquid crystal display device according to claim 3; wherein the scattering liquid crystal layer comprises a phase shifting liquid crystal layer which undergoes a variation in light scattering state by application of a voltage thereto.

5. A reflective type liquid crystal display device according to claim 1; wherein the solar cell has a layer of a solar battery material.

6. A reflective type liquid crystal display device comprising: an upper substrate; a lower substrate; a light scattering liquid crystal layer disposed between the upper substrate and the lower substrate; a solar cell disposed on a surface of the lower substrate; an active element for driving the light scattering liquid crystal layer, the active element being disposed on the surface of the lower substrate on which the solar cell is disposed; an insulation layer disposed on the solar cell and the active element, the insulation layer having a plurality of connection ports; and a pixel electrode disposed on the insulation layer and connected to the active element through the connection ports.

7. A reflective type liquid crystal display device comprising: an upper substrate; a lower substrate; a light scattering liquid crystal layer disposed between the upper substrate and the lower substrate; an active element having a layer disposed on a surface of the lower substrate for driving the light scattering liquid crystal layer; and a solar cell disposed on the surface of the lower substrate on which the active element is disposed, the solar cell having a layer of a solar battery material, the layer of the active element and the layer of the solar cell being made of the same material.

8. A reflective type liquid crystal display device comprising: a first transparent substrate; a second transparent substrate; a light scattering liquid crystal layer disposed between the first and second transparent substrates; and a solar cell disposed on the second transparent substrate, a portion of the solar cell comprising an active element for driving the light scattering liquid crystal layer.

9. A reflective type liquid crystal display device according to claim 8; further comprising an insulation layer disposed on a portion of the solar cell film, the insulation layer having a plurality of connection ports; and a plurality of pixel electrodes connected to the active element through the connection ports of the insulation layer.

10. A reflective type liquid crystal display device according to claim 8; wherein the solar cell and the active element are disposed on the same surface of the second transparent substrate.

* * * * *